United States Patent
Palmas

[19]

[11] Patent Number: 6,063,263

[45] Date of Patent: May 16, 2000

[54] PROCESS FOR FEED CONTACTING WITH IMMEDIATE CATALYST SEPARATION

[75] Inventor: Paolo Palmas, Des Plaines, Ill.

[73] Assignee: UOP LLC, Des Plaines, Ill.

[21] Appl. No.: 09/270,585

[22] Filed: Mar. 16, 1999

Related U.S. Application Data

[60] Provisional application No. 60/082,965, Apr. 24, 1998.

[51] Int. Cl.[7] .................................................. C10G 11/00
[52] U.S. Cl. ..................... 208/113; 208/118; 208/120.01; 208/120.1; 208/146
[58] Field of Search ..................................... 208/113, 118, 208/120.01, 120.1, 146

[56] References Cited

U.S. PATENT DOCUMENTS

| | | | |
|---|---|---|---|
| 2,935,466 | 5/1960 | Schoenmakers | 208/176 |
| 4,435,272 | 3/1984 | Bartholic et al. | 208/127 |
| 4,944,845 | 7/1990 | Bartholic | 202/84 |
| 4,985,136 | 1/1991 | Bartholic | 208/153 |
| 5,296,131 | 3/1994 | Raterman | 208/113 |
| 5,462,652 | 10/1995 | Wegerer | 208/167 |
| 5,565,020 | 10/1996 | Niewiedzial | 95/271 |

*Primary Examiner*—Walter D. Griffin
*Assistant Examiner*—Nadine Preisch
*Attorney, Agent, or Firm*—John G. Tolomei

[57] ABSTRACT

A particular arrangement of an FCC unit creates an immediate and sustained gravity separation of catalyst and hydrocarbon vapors in short contact time cracking operation. A transverse feed contactor ejects the mixture of catalyst and hydrocarbon vapors transversely into a central portion of a separation vessel for vertical disengagement of catalyst from vapors. The vapors travel upwardly in the vessel into an inertial separator that quickly segregates entrained catalyst from the hydrocarbon vapors and collects separated catalyst at a higher elevation for stripping of adsorbed hydrocarbons from the catalyst.

14 Claims, 3 Drawing Sheets

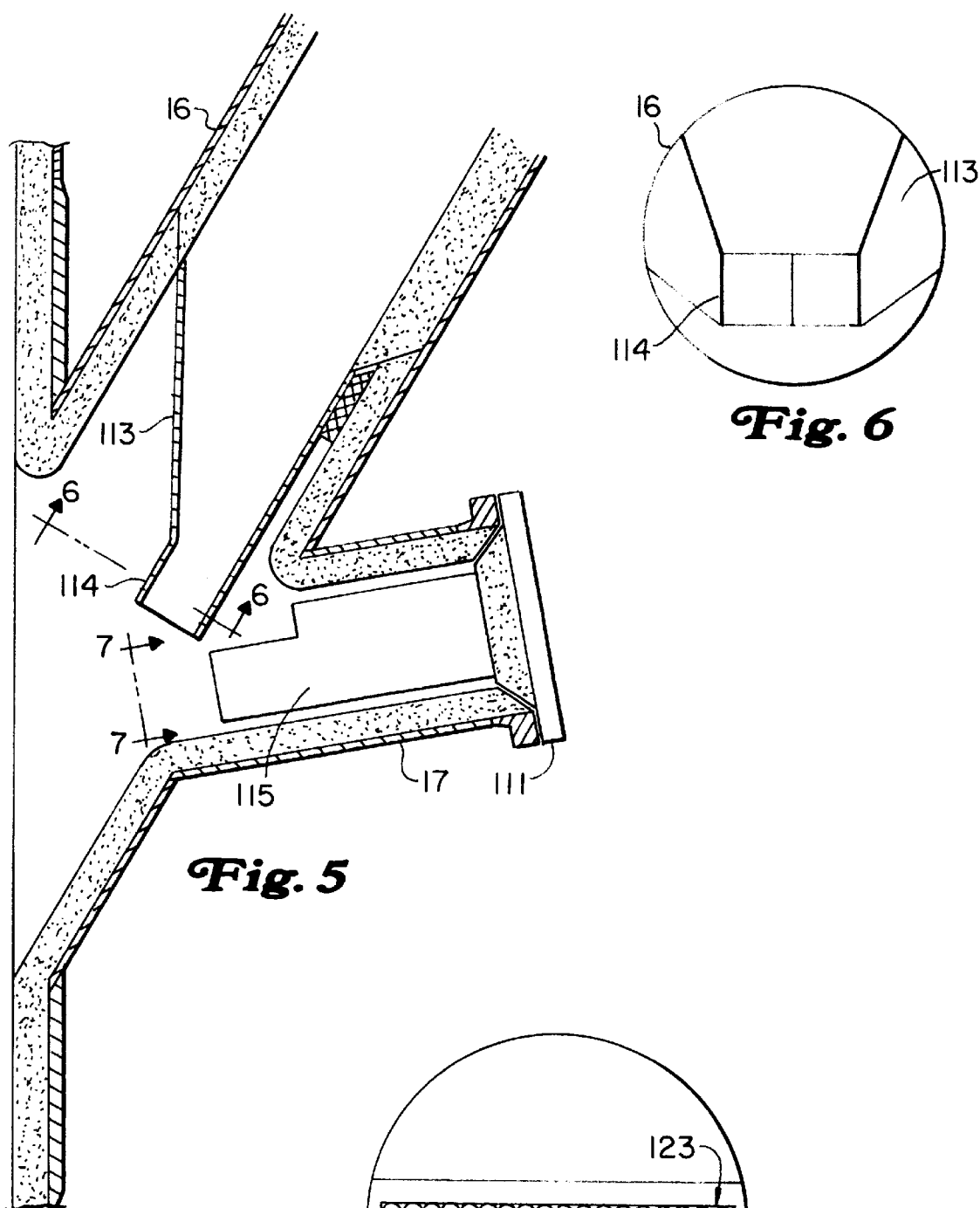

PROCESS FOR FEED CONTACTING WITH IMMEDIATE CATALYST SEPARATION

CROSS REFERENCE TO RELATED APPLICATION

This application claims the benefit of the filing date of provisional application 60/082,965 filed Apr. 24, 1998.

BACKGROUND OF THE INVENTION

1. Field of the Invention

This invention relates generally to the contacting of FCC feeds with catalyst for ultra-short time periods. More specifically this invention relates to a method and apparatus for disengaging hydrocarbons and from catalyst particles.

2. Description of the Prior Art

There are a number of continuous cyclical processes employing fluidized solid techniques in which an at least partially liquid phase stream containing hydrocarbon compounds contacts the fluidized solids in a contacting zone and carbonaceous or other fouling materials are deposited on tile solids. The solids are conveyed during the course of the cycle to another zone where foulants are removed in a rejuvenation section or, more specifically, in most cases carbon deposits are at least partially removed by combustion in an oxygen-containing medium. The solids from the rejuvenation section are subsequently withdrawn and reintroduced in whole or in part to the contacting zone. The solids may be catalytic materials or inert solids.

One of the more important processes of this nature is the fluid catalytic cracking (FCC) process for the conversion of relatively high-boiling hydrocarbons to lighter hydrocarbons. The hydrocarbon feed is contacted in one or more reaction zones with the particulate cracking catalyst maintained in a fluidized state under conditions suitable for the conversion of hydrocarbons.

The processing of increasingly heavier feeds in FCC type processes and the tendency of such feeds to elevate coke production and yield undesirable products has led to new methods of contacting feeds with catalyst. Recently, methods of contacting FCC catalyst for very short contact periods have been of particular interest. Falling-curtain type arrangements for contacting feed are known from U.S. Pat. No. 2,935,466; the contents of which are hereby incorporated by reference. In U.S. Pat. No. 4,985,136, an FCC feed contacts a falling-curtain of catalyst for a contact time of less than 1 second followed by a quick separation. U.S. Pat. No. 5,296,131, the contents of which are hereby incorporated by reference, discloses a similar ultra short contact time process that uses an alternate arrangement for the falling catalyst curtain. The ultra short contact time system improves selectivity to gasoline while decreasing coke and dry gas production by using high activity catalyst that previously contacted the feed for a relatively short period of time. The inventions are specifically directed to zeolite catalysts having high activity. Additional arrangements for performing such feed contacting are known from U.S. Pat. Nos. 4,435, 272, 4,944,845, and 5,462,652.

The type of injection desired for short contact time arrangements has received particular attention in the above referenced patents. The feed may be formed into a jet by an array of identical feed injection streams or by an extended orifice that uniformly contacts a stream of catalyst flowing in a compatible pattern. The feed injection is arranged to shoot the feed into a relatively thin band of catalyst that falls in a direction perpendicular to the flow of jets.

Aside from uniform feed and catalyst contacting, short contact time also requires good separation between the catalyst and hydrocarbons. The above described prior art typically directs the catalyst and vapor mixture into a conduit that communicates with a downstream separation device. Therefore, contact of the hydrocarbons with the catalyst will continue for a substantial period of time as it flows to the separation device and while it is in the separation device.

SUMMARY OF THE INVENTION

An object of this invention is to further limit contact time between catalyst and hydrocarbon in an arrangement for contacting relatively heavy hydrocarbon feeds and fluidized catalyst particles for ultra short periods of time.

This invention provides rapid separation of a feed from a catalyst stream by injecting the catalyst stream together with the contacted vapors into a disengaging zone in a substantially horizontal direction under dilute catalyst phase conditions and by immediately withdrawing cracked vapors from an upper portion of the dilute phase zone. Horizontal dilute phase injection into a disengaging vessel combined with the upper draw-off of vapors initiates an immediate gravity separation of the catalyst from the hydrocarbons vapors. By this method a significant portion of the contacting between the catalyst and hydrocarbons ceases immediately upon injection of the catalyst stream into the disengaging vessel. Contacting of the feed with the catalyst stream can occur at about the same location or near the same location as the injection of the catalyst stream into the disengaging vessel. In this manner ultra short contact times may be controlled from minimal times that approach zero to longer times. Unlike the prior art, this invention does need to maintain contact while the catalyst and hydrocarbon mixture travels together vertically or horizontally to a stage of separation.

Accordingly, in one embodiment this invention is a process for the fluidized catalytic cracking a hydrocarbon feed. The process injects catalyst particles and hydrocarbons from an injection point into a disengaging zone in a substantially horizontal direction. A collection zone collects descending catalyst particles below the injection point. A distance of at least 5 feet in the disengaging zone between the injection point and the collection zone provides a settling zone for continued separation of the catalyst and hydrocarbons vapors. The process collects rising vapors and entrained catalyst particles from an upper portion of the discharge zone and transfers them to an inertial separation zone. The inertial separation zone separates entrained catalyst from the rising vapors to provide a separated vapor stream and separated catalyst. The process recovers hydrocarbons from a lower portion of the disengaging zone and the separated vapor stream.

Typically, a jet of a hydrocarbon-containing feed is injected—in a principally transverse direction—into a flowing layer of catalyst particles upstream of the injection point and at the periphery of the disengaging zone or outside of the disengaging zone. A particularly useful form of this invention uses a standpipe as a location for a distributor nozzle arrangement that performs contacting of a hydrocarbon-containing stream with a falling layer of particulate material. Generally the injection of the jet of hydrocarbon-containing feed into the flowing layer of catalyst particles takes place in the confined conduit, but near the outlet of the conduit into the disengaging vessel. Location of the distributor in standpipe will typically allow the discharge of the fluid and solids mixture directly from the distributor into the disengaging vessel at a suitable elevation for the practice of this invention. A standpipe distributor arrangement can fit compactly near the junction of most standpipes with the disengaging vessel.

In an apparatus embodiment this invention comprises a disengaging vessel portion and catalyst and a feed contractor for injecting the feed and catalyst from an injection point into the disengaging vessel portion in a substantially horizontal direction. The feed contractor injects a hydrocarbon-containing feed into a flowing stream of catalyst to supply the feed and catalyst to the injection point. A collector vessel portion, located subjacent to the disengaging vessel portion and at least 5 feet below the injection point, collects a dense bed of catalyst from the disengaging vessel portion. An inertial separator, located superjacent to the disengaging vessel portion, communicates directly with an upper portion of the disengagement vessel portion to separate hydrocarbons from catalyst particles that rise with the hydrocarbons from the disengaging vessel portion. A catalyst outlet, defined by the inertial separator, recovers separated hydrocarbons from the inertial separator.

Additional objects, embodiments and details of this invention can be obtained from the following detailed description of the invention.

BRIEF DESCRIPTION OF THE DRAWINGS

FIG. 5 is a section of standpipe conduit portion that contains a contractor for use in this invention.

FIG. 6 is a section of the standpipe conduit portion taken at lines 6—6 of FIG. 5.

FIG. 7 is a front view of a feed distributor taken at lines 7—7 of FIG. 5.

DETAILED DESCRIPTION OF THE INVENTION

Figure 2:
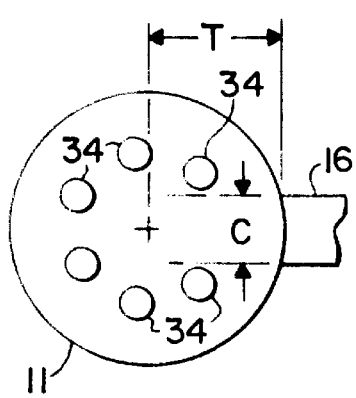
FIG. 2 is a schematic section taken across lines 2—2 of FIG. 1.

This invention can be used in combination with any type of particulate material. The material may be inert or reactive in the presence of the particular fluid material. A wide variety of inert and catalytic material is suitable for this invention. For example in destructive distillation processes a suitable inert material comprises an alpha alumna. FCC applications of this process can include any of the well-known catalysts that are used in the art of fluidized catalytic cracking. These compositions include amorphous-clay type catalysts which have, for the most part, been replaced by high activity, crystalline alumna silica or zeolite-containing catalysts. Zeolite-containing catalysts are preferred over amorphous-type catalysts because of their higher intrinsic activity and their higher resistance to the deactivating effects of high temperature exposure to steam and exposure to the metals contained in most feedstock's. Zeolites are the most commonly used crystalline alumna silicates and are usually dispersed in a porous inorganic carrier material such as silica, alumna, or zirconium. These catalyst compositions may have a zeolite content of 30% or more. Zeolite catalysts used in the process of this invention will preferably have a zeolite content of from 25–80 wt. of the catalyst. The zeolites may also be stabilized with rare earth elements and contain from 0.1 to 10 wt. of rare earth's.

Although primarily intended for use in FCC units, this invention may be useful for any process that seeks to contact hydrocarbon-containing streams with a fluidized particulate stream for short periods of time. The types of processes in which this invention may be useful include the contacting of catalyst with residual feeds and the destructive contacting of high asphaltene-containing feed with high temperature inert or catalytic particles. Suitable liquid media for this invention include any liquid stream that will enter the distributor at least partially as a liquid and that is further vaporized by contact with the particulate material. Feed for destructive contacting will comprise highly refractory crudes having boiling points that extend over wide ranges and having high concentrations of metals and coke. For example one typical crude has a boiling point that ranges from 240°–1575° F. with more than half of the liquid volume boiling above 1000° F. For the FCC process, feedstocks suitable for processing by the method of this invention include conventional FCC feeds and higher boiling or residual feeds. The most common of the conventional feeds is a vacuum gas oil which is typically a hydrocarbon material having a boiling range of from 650°–1025° F. and which is prepared by vacuum fractionation of atmospheric residue. These fractions are generally low in coke precursors and the heavy metals which can deactivate the catalyst. Heavy or residual feeds, i.e., which have a boiling range above 930° F. and which have a high metals content, are also finding increased usage in FCC units.

When applied in catalyst operations both the metals and coke serve to deactivate the catalyst by blocking active sites on the catalysts. To overcome its deactivating effects, coke can be removed to a desired degree by regeneration. Metals, however, accumulate on the catalyst and poison the catalyst. In addition, the metals promote undesirable cracking thereby interfering with the reaction process. Thus, the presence of metals usually influences the regenerator operation, catalyst selectivity, catalyst activity, and the fresh catalyst makeup required to maintain constant activity. The contaminant metals include nickel, iron, and vanadium. In general, these metals affect selectivity in the direction of less gasoline, and more coke and dry gas. Due to these deleterious effects, the use of metal management procedures within or before the reaction zone are anticipated in processing heavy feeds by this invention.

Figure 1:
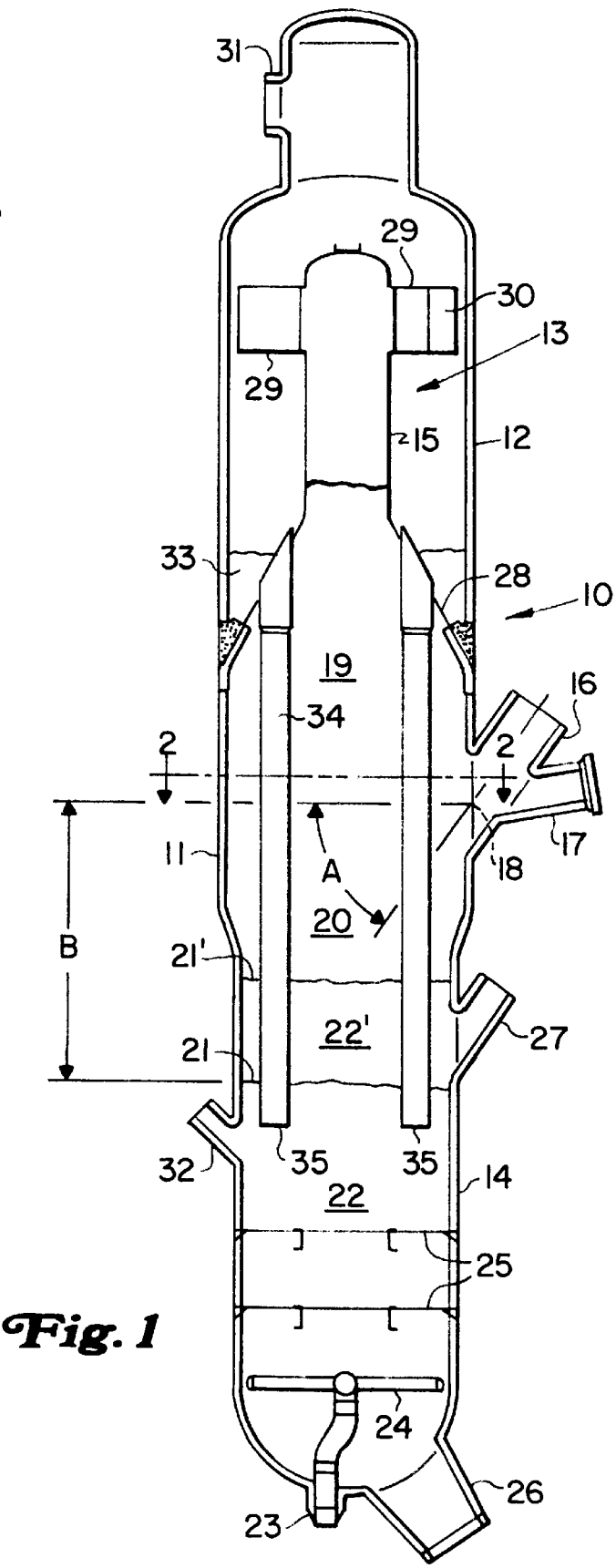
FIG. 1 is a schematic illustration of an FCC apparatus that incorporates a short contact time arrangement of this invention.

This invention is more fully explained in the context of an FCC process. FIG. 1 shows an FCC arrangement that is arranged in accordance with this invention. The description of this invention in the context of the specifically disclosed process arrangement is not meant to limit it to the details disclosed therein. The FCC arrangement shown in FIG. 1 consists of a reactor 10 that includes a disengaging vessel portion 11, a collection vessel portion 14, and a separator 13. Separator 13 includes a separator vessel portion 12 and a riser 15. The arrangement circulates catalyst and contacts feed in the manner hereinafter described.

Looking then at the operation of the reaction zone, fresh regenerated catalyst, spent catalyst, or a mixture thereof enters the reactor through a nozzle 16 which typically communicates with the end of a regenerated catalyst standpipe. Feed is injected into standpipe nozzle 16 through a feed injection nozzle 17 that contacts the catalyst, preferably through a contactor as further described herein. After or simultaneously with the contact between the feed and the hydrocarbons, the feed and catalyst particles enter the disengaging vessel portion 11 from an injection point 18.

Contact of the catalyst and the feed will produce a concentrated stream of catalyst that flows into the disengaging vessel portion 11 along a substantially horizontal flow path. The substantially horizontal flow is defined to mean a flow path that has at least a principal horizontal component. The principal direction of the catalyst stream as it enters the disengaging vessel will primarily dictate the entering trajectory of the-feed and hydrocarbon stream. Therefore, the hydrocarbon stream will be directed into the disengaging vessel at an angle, shown in FIG. 1 as A, of 60° or less to ensure that the momentum of the catalyst moves the mixture of catalyst and hydrocarbon in a substantial horizontal direction across disengaging vessel portion 11. The substantial horizontal discharge from the disengaging point promotes a quick disengagement of the vaporous hydrocarbon stream from the relatively heavier catalyst particles. Rapid disengagement also requires a vertical space for unrestricted passage of the rising vapors upwardly through the disengaging vessel 11. For this purpose, the disengaging vessel portion will have a substantially open volume 19 above the injection point and perhaps, more importantly, an open volume 20 below the injection point. Open volume 20 is defined as a region of the dilute catalyst density above a catalyst interface 21 and shown as dimension B in FIG. 1. Dimension B will be at a minimum of at least 5 feet and, more typically, will be from 7 to 12 feet. Dilute phase conditions refer to a catalyst density of less than 20 lbs/ft$^3$ and, more typically, will refer to a density of less than 10 lbs/ft$^3$. Catalyst density in open volumes 19 and 20 will vary with proximity to the feed and catalyst contact point. Usually the density of the open volume will not exceed an average of 5 lbs/ft$^3$; and typically, it will have an average catalyst density of less than 3 lb/ft$^3$. Catalyst from open volumes 19 and 20 collects in a dense bed 22 within collection zone 14. Dense phase conditions are characterized by an apparent bulk density of the catalyst in a range of from 15 to 50 lb/ft$^3$. Thus the dense bed of collection zone 22 typically retains catalyst particles at a density of at least 15 lbs/ft$^3$ and, more typically, catalyst particles are retained at a density of 45 lbs/ft$^3$ or more. The distance B over the disengaging zone 11 may also serve as a settling zone where catalyst disengages and settles from the rising vapors.

Collection zone 14 may serve as a stripping zone for the recovery of entrained and adsorbed hydrocarbons from catalyst entering collection zone 14. Stripping gas enters the collection zone 14 through a nozzle 23 and a distributor 24. A dispersed stripping gas, such as steam, rises upwardly the catalyst. The series of grids 25 may provide redistribution of the stripping medium and stripped hydrocarbons as they pass upwardly through the bed 22. A nozzle 26 withdraws the stripped catalyst for regeneration in a regenerator vessel (not shown) and/or recycle to nozzle 16 for recontacting of catalyst with the feed. The optional addition of hot regenerated catalyst to bed 22 can facilitate stripping by raising the temperature in the stripping zone. Hot catalyst may enter the stripping zone above bed interface 21 through a nozzle 27. Alternately, an extended bed portion 22' with a higher catalyst interface 21' may be maintained to keep the dense phase catalyst above the entry point of the regenerated catalyst through nozzle 27, provided the minimum disengagement length is provided between injection point 18 and bed level 21'.

It is also possible, through baffling not shown, to isolate recovered stripped hydrocarbons from a lower portion of bed 22. Segregation of the stripped hydrocarbons can provide different product streams for downstream separation and recovery. The longer contact time of the hydrocarbons that enter the collection can substantially alter the properties of the cracked hydrocarbons recovered from this zone. Separate recovery of a stream from the stripping zone may facilitate independent recovery of an isolated product stream from an upper portion of the disengaging vessel 11.

However, the stripping medium as well as the stripped hydrocarbons will ordinarily rise through the disengaging vessel 11 and combine with the disengaged hydrocarbons that enter with the catalyst stream from nozzle 16. As the vapors and entrained catalyst rise through disengaging zone 19, a transition section in the form of a truncated cone 28 reduces the fluid flow area and increases the velocity of the gases as they enter riser 15. The conditions within disengaging zone 19, cone 28, and riser 15 are often referred to as fast fluidized conditions in which the upward catalyst transfer velocity may range between 20 to 60 ft/sec with a density range of from 4 to 34 lbs/ft$^3$.

The rising hydrocarbons and any additional entrained catalyst will rise upwardly into an inertial separation device provided by a pair of arms 29 each having tangentially directed openings 30. Arms 29 provide an inertial separation by centripetal acceleration of the relatively heavy catalyst particles that quickly removes most of the catalyst from the hydrocarbon vapors. Additional details of the arrangement of such arms and separation devices are further disclosed in U.S. Pat. No. 5,565,020; the contents of which are hereby incorporated by reference. The depiction of tangentially oriented openings to provide a centripetal or cyclonic type separation is not meant to preclude other inertia separation devices such as those that use a ballistic separation of particles from the hydrocarbon vapors. Cracked hydrocarbons with trace amounts of catalyst exit separator 13 through an outlet 31.

Hydrocarbon vapors from outlet 31 will, in most cases, undergo further separation for the recovery of the trace amounts of catalyst particles. Cyclone separators will normally provide the secondary recovery of the residual catalyst particles. Catalyst particles recovered from additional separators may return to the collection zone 14 via a nozzle 32.

After any additional catalyst recovery, products are typically transferred to a separation zone for the removal of light gases and heavy hydrocarbons from the products. For this purpose product vapors may enter a main column (not shown) that contains a series of trays for separating heavy components such as slurry oil and heavy cycle oil from the product vapor stream. Lower molecular weight hydrocarbons are recovered from upper zones of the main column and transferred to additional separation facilities or gas concentration facilities.

Catalyst recovered from the inertial separator 13 collects in a bed 33 for return to bed 22 in the collection zone 14. Catalyst may pass from bed 33 to the collection zone 14 through one or more internal or external standpipes 34. FIG. 1 shows an arrangement of internal standpipes 34 that return catalyst from bed 33 in isolation from the open volumes 19 and 20 of disengagement zone 11. The bottoms 35 of standpipes 34 are typically submerged in bed 22. The submersion of standpipe bottoms 35 prevents the backflow of stripped vapors through the standpipes and into the separated vapors that collect at the top of separation zone 13.

Internal standpipes 34 have an arrangement that leaves a clear trajectory for the injected hydrocarbon and catalyst particles as it enters disengaging zone 11 from injection point 18. As shown more clearly in FIG. 2, the spacing of internal conduits 34 is increased in the area of nozzle 16 to provide a spacing between conduits 34 equal to dimension C. Dimension C will, preferably, at least equal the diameter of nozzle 16. By this layout the injected hydrocarbons and catalyst particles have a clear trajectory path that extends at least to the center of the disengaging zone 11 as shown by dimension T.

Figure 3:
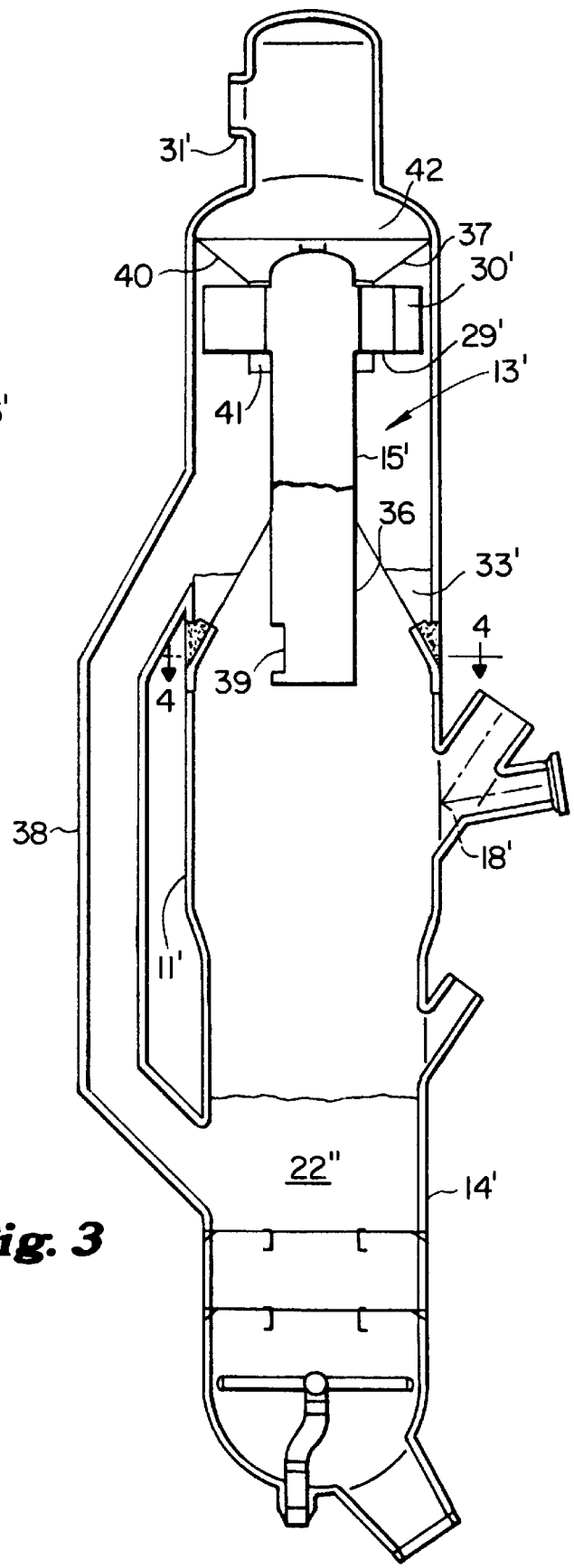
FIG. 3 is a schematic illustration of an FCC apparatus that incorporates an alternate short contact time arrangement of this invention.

The configuration of the inertial separator 13 and the return of catalyst to the collection zone 14 may be accomplished in a variety of different ways. FIG. 3 shows an alternate arrangement that uses a downwardly extended conduit 36 together with a separation shroud 40 to increase the recovery of separated catalyst from the inertial separation device and return of the catalyst to a dense bed 22" by an external standpipe 38. The apparatus of FIG. 3 operates in a similar manner to the apparatus described in conjunction with FIG. 1. The major differences are the introduction of an additional change in vapor direction as vapor passes upwardly in disengaging vessel portion 11' and further separation of catalyst particles from the hydrocarbon vapors before the mixture leaves the separation zone 13'. More specifically, hydrocarbons entering disengaging vessel portion 11' from injection point 18' are further separated from the entering catalyst particles as the vapors flow to an opening 39 that receives the initially separated hydrocarbon vapors. Opening 39 serves as separator inlet and faces a side of the disengaging zone that is opposite the side from which the catalyst particles and hydrocarbons are injected through injection point 18'. In this manner, the hydrocarbons exit the disengaging zone on a side opposite from which the catalyst particles and hydrocarbons are injected.

Hydrocarbons and entrained catalyst from inlet 39 continue upwardly through riser section 15'. Arms 29' again tangentially discharge the catalyst and entrained catalyst particles through openings 30'. A shroud 40 provides a restricted opening 41 for recovered vapors that pass upwardly into a secondary section 42 of separator 13'. The configuration and operation of such a shroud is further described in the previously referenced patent U.S. Pat. No. 5,565,020. Recovered hydrocarbons together with any, residual catalyst again leave the separation zone 13' through a nozzle 31'.

External standpipe 38 recovers catalyst from a bed 33' that collects catalyst from inertial separator 13'. Conduit 38 passes catalyst around disengaging zone 11' and into catalyst bed 22" of collection zone 14'. External standpipe 38' leaves disengaging zone 11' completely open for disengagement of hydrocarbon vapors from the catalyst stream.

Figure 4:
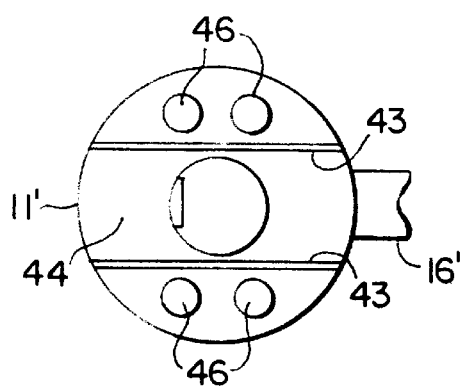
FIG. 4 is a schematic section taken across lines 4—4 of FIG. 3.

The open section of the disengaging zone may be further segregated to confine the separation of the hydrocarbons from the stream of catalyst particles. As shown in FIG. 4, a pair of baffles 43 may be placed in proximity to a catalyst conduit 16' that discharges the catalyst particles and feed mixture into a central portion 44 of the disengaging zone 11'. Disengaging zone 11' may be further modified to provide conduits for returning the catalyst particles that are located outside of the area 44'. Catalyst conduits 46 may be located in the circular sectors to the outside of baffles 43.

The process and apparatus of this invention may initially contact the feed with regenerated catalyst, carbonized catalyst, or a mixture of the two. The process can use any type of regeneration for the removal of coke. Coke removal from the regenerated catalyst which ordinarily operates to completely remove coke from catalyst is generally referred to as "complete regeneration". Complete regeneration removes coke from the catalyst to a level of less than 0.2 wt %, or preferably to less than 0.1 wt %, and or more preferably, to less than 0.05 weight percent coke.

Regenerated catalyst will have a substantially higher temperature than carbonized catalyst. Regenerated catalyst that usually enters the regenerated conduit 16 will have a temperature in a range from 1100 to 1400° F. and, more typically, the temperature will be in a range of from 1200 to 1400° F. Once the catalyst mixture contacts the feed, the catalyst accumulates coke on the catalyst particles and has a lower temperature. The temperature of the carbonized catalyst will usually be in a range of from 900 to 1150° F., but its temperature will vary depending on its source.

A preferred standpipe and feed injection arrangement for this invention is shown in FIG. 5. FIG. 5 illustrates a contactor 115 that atomizes the feed into streams of fine liquid droplets. A flange 111 at the end of conduit 17 usually retains contactor 115 in conduit 17. Collectively the streams produced by contactor 115 provide a linear array of catalyst that contacts a falling curtain of catalyst formed by an outlet 114 of a chute 113.

Contact of the feed with the catalyst causes a rapid vaporization and a high velocity discharge of catalyst into the disengaging vessel. Contact between the feed and catalyst cracks the heavier hydrocarbons into lighter hydrocarbons and produces coking of the most active catalyst sites on the catalyst. The transverse contacting of the feed with the vertically falling catalyst curtain creates a beneficial trajectory of the catalyst and feed mixture into the disengaging vessel. The feed preferably contacts the curtain of falling catalyst in a transverse direction to obtain a quick contacting between the feed and the catalyst particles. For the purposes of this description the expression "transversely contacting" means the feed does not flow parallel to the direction of the falling curtain. The catalyst particles, after injection of the jet of hydrocarbons, typically flow less than 5 feet through conduit 17 and, preferably flow less than 1 foot before injection into the disengaging zone from the injection point.

As shown by FIGS. 5 and 6 chute 113 is fixed to the inside of conduit 116 and opening 114 usually has a rectilinear shape. The chute will usually have a width equal to or greater than about half the width of conduit 16. Catalyst for discharge enters conduit 16 from a control valve, i.e. typically a slide valve. (not shown). The control valve regulates the flow rate of catalyst into chute 113. The discharge velocity of the catalyst from outlet 114 may be controlled by the addition of fluids upstream of chute 113.

Contactor 115 will produce a spray pattern that is compatible with the geometry of the falling curtain. Where the falling curtain has a linear shape as depicted in the figures, the feed injector will generally produce a horizontal pattern of atomized liquid. Accordingly, in a typical arrangement, the feed is discharged in a substantially transverse direction with respect to the catalyst curtain. Substantially transverse contact is used to describe the case where the principal direction of catalyst flow has an included angle of at least 30° and preferably at least 45° between the principal direction by which contactor 115 injects the feed into the layer or curtain of catalyst. Preferably the feed flows perpendicularly into contact with a downwardly moving curtain of catalyst. When contacting the falling curtain of catalyst, the feed will typically have a velocity greater than 10 ft/sec and a temperature in the range of from 300° to 600° F.

The nozzles of contactor 115 are sized to create jets having a fluid velocity out of the openings in a range of from 30 to 400 feet per second and preferably, the velocity will be in the range of 100 to 300 ft/sec. In accordance with typical FCC practice the feed exits the nozzle openings in contactor 115 as a spray. Droplet size within the spray and the velocity of the spray determines momentum of the feed as it enters the disengaging vessel. It is difficult to increase the momentum of the feed above a given level since the velocity of the feed injection is inversely proportional to the size of the droplets in the emanating spray. Higher velocities for the spray tend to directly increase the momentum of the spray but to indirectly decrease the momentum by reducing the size of the exiting droplets. Conversely, the reduced momentum that results directly from lower spray velocities is offset by the typical production of larger droplets. In the preferred practice of this invention where the fluid entering the jets comprises a substantially liquid oil feed, lower jet velocities are preferred.

The dispersion of the feed into yet finer droplets is promoted by imparting sufficient energy into the liquid. Where desired any of the prior art methods may be used in combination with the feed injection arrangement of this invention. In some cases, this invention will be practiced with some addition of a gaseous diluent, such as steam, to the feed before discharge through the orifices. The addition of the gaseous material can aid in the atomization of the feed. A minimum quantity of gaseous material, usually equal to about 0.2 wt. % of the combined liquid and gaseous mixture, is typically commingled with the liquid before its discharge through the nozzles. Typically the quantity of any added steam is 5 wt % or less of the combined gaseous and liquid mixture. Atomization will, for most liquids, produce droplets in a size range of from 50 to 750 microns. The liquid or feed entering the contactor 115 will usually have a temperature below its initial boiling point, but the temperature will be above the boiling point of any steam or gaseous medium that enters the contactor 115 along with the liquid. This blending is typically mild and normally will add a pressure drop of less than 10 psi to the system.

FIG. 7 shows a linearly extended array of nozzles 123 extending across the front face of contactor 115. Nozzles 123 are orientated to inject an atomized mixture of fluids directly out from contactor 115 in a straight flow pattern from the more centrally located nozzles. Those nozzles 123 that are located more to the outside of the array may be angled to orient the injected atomized liquid over a wider pattern and to maintain an even spacing between jets. Nozzles 123 may be angled in this manner to cover any length or configuration of catalyst flow pattern or catalyst dispersion.

In most cases, the contacting vessel will not expose the feed contactor to significant concentrated flows of catalyst. The flow of catalyst into which the nozzles inject the dispersed fluid is spaced away from the nozzles so that under ordinary circumstances direct erosion from catalyst will not have a significant impact on the contactor 115. However, for those unusual circumstances where there is a flow path of catalyst that exposes the nozzles to erosion, suitable abrasion-resistant materials for use with the nozzles are well known to those skilled in the art.

What is claimed is:

1. A process for the fluidized catalytic cracking of a hydrocarbon-containing feed, said process comprising:
   a) injecting a jet of a hydrocarbon-containing feed in a principally transverse direction, into a flowing layer of catalyst particles upstream of an injection point located at the periphery of a disengaging zone or outside of a disengaging zone;
   b) injecting catalyst particles and hydrocarbons from the injection point into a disengaging zone in a substantially horizontal direction having a substantially open volume above and below the injection point;
   c) collecting descending catalyst particles in a collection zone below the injection point and maintaining a settling distance of at least 5 feet in the disengaging zone between the injection point and the collection zone;
   d) collecting rising vapors and entrained catalyst particles from the substantially open volume located above the injection point and transferring the rising vapors and entrained catalyst particles to an inertial separation zone and separating entrained catalyst from the rising vapors to provide a separated vapor stream and separated catalyst; and,
   e) recovering hydrocarbons from a lower portion of the disengaging zone and the separated vapor stream.

2. The process of claim 1 wherein the hydrocarbons recovered from the lower portion of the disengaging zone pass upwardly to the inertial separator and are recovered as part of the separated vapor stream.

3. The process of claim 1 wherein separated catalyst collects with the descending catalyst in a common stripping zone.

4. The process of claim 1 wherein the collection zone comprises a stripping zone and stripping fluid contacts descending catalyst in the stripping zone and the stripping vapors together with the recovered hydrocarbons pass upwardly through the disengaging zone and enter the inertial separator with the rising vapors.

5. The process of claim 1 wherein separated catalyst is collected above the disengaging zone and passes downwardly to the collection zone in isolation from the rising vapors.

6. The process of claim 1 wherein the inaction of the jet of hydrocarbon-containing feed into the flowing layer of catalyst particles takes place in a confined conduit.

7. The process of claim 6 wherein the catalyst particles after injection of the jet of hydrocarbons flow less than 5 feet through the conduit before injection into the disengaging zone from the injection point.

8. The process of claim 1 wherein a regenerated catalyst stream enters the disengaging zone or the collection zone below the injection point.

9. The process of claim 8 wherein the regenerated catalyst enters the disengaging zone through a regenerated catalyst inlet and wherein the settling of the catalyst takes place in a settling zone that extends below the regenerated catalyst inlet.

10. The process of claim 1 wherein the disengaging zone has on average a catalyst density of less than 5 $lb/ft^3$.

11. The process of claim 9 wherein the collection zone comprises an at least relatively dense catalyst bed having a catalyst density greater than 15 $lb/ft^3$.

12. The process of claim 1 wherein the inertial separation performs a ballistic or centripetal separation of catalyst particles from vapors.

13. The process of claim 1 wherein the separated vapor stream flows from the inertial separator to a cyclone separator to recover residual catalyst particles that pass directly to the collection zone.

14. The process of claim 1 wherein the rising vapors and entrained catalyst particles enter the inertial separator through a separator inlet having an opening that faces a side of the disengaging zone opposite the side from which the catalyst particles and hydrocarbons are injected.

* * * * *